Patented Oct. 2, 1951

2,569,920

UNITED STATES PATENT OFFICE 2,569,920

COATING COMPOSITIONS AND PROCESSES OF APPLYING SAME TO GLASS

Allen Cleland Buck, New Brunswick, and Joseph Francis Conlon, Metuchen, N. J., assignors to E. I. du Pont de Nemours & Company, Wilmington, Del., a corporation of Delaware No Drawing. Application April 21, 1949, Serial No. 88,916

22 Claims. (Cl. 117—124)

This invention relates to the art of coating compositions and, more particularly, to coating compositions containing epoxyhydroxy polyether resins and certain aliphatic polycarboxylic acids, a process of applying said compositions, and decorative glass articles containing these coatings.

Polyether resins, and coating compositions containing them, have been disclosed in various patents, such as 2,060,715 and 2,456,408. More specifically, the first-mentioned patent disclosed that the chemical inertness of many of the polyether resins of the prior art may be advantageously modified by incorporating reactive hydroxyl groups in the linear polymer by using a polyhalide resinification reactant containing one or more aliphatic alcohol groups, such as glycerol dichlorohydrin.

It has also been proposed to esterify the resulting hydroxy polyether resins, which are really polymeric polyhydric alcohols, with fatty acids, and to incorporate the resulting esters in coating compositions.

It has been further proposed to modify such fatty acid esters by joint esterification of the reactive polyether with a mixture of monocarboxylic fatty acids and dicarboxylic acids of the type of phthalic, maleic and sebacic. The latter, being difunctional, are present only as a small percentage to avoid excessive bodying and gelation. The resulting fatty esters and mixed acid esters (polyesters) used as coating compositions have been found satisfactory in adhesion to substrates in general, but particularly deficient in retention of adhesion to glass.

The present invention relates to the production of improved epoxyhydroxy polyether coating compositions by incorporating therein an aliphatic polycarboxylic acid which is a latent crosslinking agent for the resin, to a process of applying said compositions, particularly to glass, and to decorative glass articles containing these coatings.

It is, therefore, an object of this invention to provide new and improved coating compositions. It is a more particular object of this invention to provide coating compositions that are highly adherent to glass. Another object is to provide adherent coatings for glass which exhibit unusual retention of adhesion during extended immersion in water, dilute alkali solutions, soap solutions, mild acid solutions, and organic solvents. An additional object is to provide coatings that render glass articles, such as neon and fluorescent tubes, shatterproof. A still further object is to provide heat-curable coating compositions that produce hard, mar-resistant finishes, which have high chemical resistivity and exceptional retention of adhesion. Still another object is the provision of substantially permanent decorative finishes for glass. It is also an object of this invention to provide a process of applying such compositions, particularly to glass.

With the above and other objects in view, which will be apparent as the description proceeds, we have set forth our invention in the following specification, and have included several specific examples by way of illustration, but not by way of limitation:

EXAMPLE 1

*Colorless clear organic finish*

| | Parts |
|---|---|
| Epoxyhydroxy polyether resin | 33.9 |
| Citric acid | 6.1 |
| Mono-ethyl ether of ethylene glycol | 58.0 |
| Xylol | 2.0 |
| | 100.0 |

The epoxyhydroxy polyether resin used in this example was a substantially chlorine-free condensation polymer of bis-phenol (diphenylol propane) with an excess of epichlorohydrin, said polymer having a multiplicity of reactive hydroxyl groups and one or more epoxide groups. The particular species of the resin used (known commercially as Epon-1007) was characterized by the following specifications:

| | |
|---|---|
| Melting point | 125–135° C. |
| Gardner-Holdt-Viscosity (40% solids in monobutyl ether of diethylene glycol) | X—$Z_1$ |
| Esterification equivalent | 190 |

The ratio in the above composition is 1.8 parts of citric acid to 10 parts of resin. If only the three carboxyl groups of the acid undergo condensation with the resin, the equivalent weight of the acid is 64 and the reactant ratio should be about 3.4 parts of acid per 10 parts of resin. If the hydroxyl also condenses with the resin, as we assume to be the case, the equivalent weight is about 48 and the optimum ratio should be 2.5 parts of acid per 10 parts of resin. In actual practice this was found to be the ratio that gave optimum results.

The composition was applied to clean glass bottles and glass plates by spray application and the coated articles were then subjected to an elevated curing temperature of 425° F. for 15 minutes.

After cooling, the resulting coated glass articles were tested for retention of adhesion of the coating by immersion in water, dilute alkali solutions, and organic solvents, such as acetone and ethyl alcohol. On removal from the liquids, the bottles and plates were dried and examined. It was found that the finishes did not whiten or soften and that the adhesion was not impaired as a result of extended immersion.

Adhesion and adhesion differences are generally difficult to describe other than in qualitative terminology, but it has been observed that the Zuhr Scratch Adhesion Tester, developed by the Bell Telephone Laboratories, yields quantitative results which are consistent with qualitative observations. This machine provides a means of measuring the scratch adhesion or film adherence in terms of the minimum load in grams required to cause removal of the film, said load being applied to a U shaped stylus. At a film thickness of .001 inch of coating, cured at 425° F. for 15 minutes, the above composition showed initial adhesion of the magnitude of 17,500 grams. After immersion in water at room temperature for three days, the adhesion was found to be of the order of magnitude of 13,500 grams. Considerably more than 50% of the initial recorded adhesion was retained.

When coatings containing this same resin without the citric acid (or equivalent material) were heated to the same temperature for the same period, and then subjected to the same immersion tests, it was found that the coatings had satisfactory initial adhesion to the glass articles, but they did not retain their adhesion, because they were not sufficiently chemically inert and because they were not cured films but retained their thermoplasticity. The retained adhesion of these films on immersion in water, measured with the adhesion tester, rapidly decreased to less than 10% of the initial high adhesion.

EXAMPLE 2

*Colorless clear organic finish*

| | Parts |
|---|---|
| Epoxyhydroxy polyether resin | 35.0 |
| Tricarballylic acid | 7.0 |
| Monoethyl ether of ethylene glycol | 56.0 |
| Silicone liquid solution | 2.0 |
| | 100.0 |

The resin was identical with that used in Example 1.

The silicone liquid solution consisted of one part of organo-siloxane liquid (supplied by General Electric Company as Silicone Liquid No. 81069) dissolved in 99 parts of xylol. This material is not essential to secure the adhesion characteristics of the products, but it may be added to the clear or pigmented products to control flow so as to produce optimum film smoothness. Many polymers cross-linked to form a thermoset film on a substrate have a tendency to exhibit surface imperfections, such as cratering and crawling, and silicone liquid is useful to overcome these surface imperfections.

Curing the applied film for 15 minutes at 425° F. gave results comparable with that of the citric acid cross-linked film of Example 1.

The preceding examples represent clear finishes which have little decorative value, but may be used as a base coating to facilitate the attachment of paper labels or to receive stencilled or printed organic finish labels, or to render glass and glass articles shatterproof, and they illustrate vehicles which may be pigmented to obtain colors having decorative value.

The following examples are presented to illustrate such colored finishes:

EXAMPLE 3

*Blue organic finish*

| First portion: | Parts |
|---|---|
| Epoxyhydroxy polyether resin | 16.0 |
| Citric acid | 6.0 |
| Monoethyl ether of ethylene glycol | 31.4 |
| Monastral blue pigment | 1.0 |
| Silicone liquid solution | 2.0 |
| Second portion: | |
| Epoxyhydroxy polyether resin | 17.4 |
| Monoethyl ether of ethylene glycol | 26.2 |
| | 100.0 |

The first portion was ground in a ball mill for 48 hours, using a ratio of about 5 parts of steel balls to 1 part of charge, by weight. The second portion was added and the grinding was continued for 24 hours. The product had about 40.4% solids and a viscosity of about 25 seconds measured by the Parlin Viscosity Cup method, using a No. 15 cup at 25° C.

The same resin was used as in the clear compositions.

The silicone liquid solution was the same as that used in Example 2.

The second portion was added to the first as a preformulated 40% solution of the polyether resin. The resin may also be charged as a preformulated solution in the first portion. Likewise, the citric acid may be charged as a preformulated solution, such as a 45% solution in the monoethyl ether of ethylene glycol.

The viscous product was reduced to spraying consistency with the following reducing thinner composition:

| | Parts (by weight) |
|---|---|
| Toluene | 75 |
| High solvency petroleum naphtha (130–190° C.) | 25 |
| | 100 |

The naphtha has an aniline point of about 2° C. and an evaporation rate between that of mineral spirits and V. M. and P. naphtha.

When the reduced composition was sprayed on glass and baked for 10 minutes at 450° F. it produced an attractive, substantially transparent, blue finish which exhibited the same desired adhesion retention and chemical inertness described for the cured clear film.

EXAMPLE 4

*Maroon organic finish*

| First portion: | Parts |
|---|---|
| Epoxyhydroxy polyether resin | 16.0 |
| Citric acid | 6.0 |
| Monoethyl ether of ethylene glycol | 31.4 |
| Victoria maroon pigment | 1.0 |
| Silicone liquid solution | 2.0 |
| Second portion: | |
| Epoxyhydroxy polyether resin | 17.4 |
| Monoethyl ether of ethylene glycol | 26.2 |
| | 100.0 |

All of the components in Example 4 were like those in Example 3, except that a monoazo dyestuff, known as Victoria Maroon, was substituted for the Monastral blue (copper phthalocyanine) pigment.

Example 4 produced a transparent red finish having the same desired properties when baked on glass at the same temperature.

The following is representative of pigmentation with an inorganic pigment:

EXAMPLE 5

*White organic finish*

First portion: Parts
- Epoxyhydroxy polyether resin____ 10.0
- Citric acid____ 4.7
- Monoethyl ether of ethylene glycol____ 20.8
- Rutile titanium dioxide____ 21.2
- Silicone liquid solution____ 2.0

Second portion:
- Epoxyhydroxy polyether resin____ 16.5
- Monoethyl ether of ethylene glycol____ 24.8

100.0

The first portion was ground for 5 days, using 2 parts by weight of pebbles for each part of charge. The second portion was added and grinding was continued for 1 more day. This product had a viscosity of 40 seconds as measured with the No. 15 Parlin cup.

Applied to glass and cured for 10 minutes at 425° F., the film was opaque white and exhibited high chemical resistivity and excellent retention of adhesion.

EXAMPLE 6

*Clear coating composition*

Parts
- Epoxyhydroxy polyether resin____ 35.0
- Citric acid____ 10.0
- Methyl isobutyl ketone____ 21.5
- Ethyl alcohol____ 33.5

100.0

The resin used in this example (known commercially as Epon 1000) had the following specifications:

- Melting point____ 55 to 65° C.
- Gardner & Holdt viscosity (40% solution in the monobutyl ether of diethylene glycol)____ B to D
- Esterification equivalent____ 110

This product applied to glass and cured for 15 minutes at 385° F. gave a tough, physical and chemical resistant coating. This finish, although generally considered adequate, and an improvement over prior art, was not fully equal to that obtained from Example 1, apparently due to the high ratio of acid and the relatively low esterification equivalent of the epoxyhydroxy polyether resin in this example.

Although only two epoxyhydroxy polyether resins have been used in the above examples, and both of these were substantially chlorine-free condensation polymers of bis-phenol with an excess of epichlorohydrin, many other epoxyhydroxy polyether resins may be used in the practice of the present invention.

Examples of other polyfunctional alcohol-contributing reactants that may be used in the preparation of epoxyhydroxy polyether resins are: epibromohydrin, epichlorohydrin of erythritol, mannitol, or sorbitol; dichlorohydrins of glycerol, mannitol, or sorbitol; and diepoxides, such as butylene oxide, bis-(2,3-epoxypropyl) ether, and diepoxides of mannitol or sorbitol.

Suitable end-group monofunctional reactants are: phenol and alkyl substituted monohydric phenols when the resinification mixture contains the epihalohydrin or polyhalohydrin in excess of equivalent proportions in reference to the polyhydric phenol. When the polyhydric phenol reactant is equivalently in excess, suitable end-group-contributing monofunctional reactants are ethylene oxide, propylene oxide, glycidol, or other monoepoxide compounds, ethylene chlorohydrin and monochlorohydrins of glycerol, mannitol or sorbitol. Epoxyhydroxy polyether resins particularly characterized herein are of this latter type.

The epoxyhydroxy polyether resins which are used in the invention may be made in any suitable way, such as disclosed in Patent 2,456,408, in which the initial reaction involves the two phenolic hydroxyls of the base phenol and the epoxide ring of the epichlorohydrin. This initial reaction product is treated with alkali to generate new epoxide rings and then the original reaction with base phenol can be repeated, and by a series of such steps products of the desired molecular weight may be built up. These products have at least one terminal epoxide group and secondary hydroxyls distributed along a chain. By varying the proportion of the polyfunctional reactants, and by the use of a monofunctional reactant for end formation, these polymeric polyhydric alcohols may be prepared with predetermined molecular weight. Obviously, the other specifications, such as melting point, esterification equivalent, and viscosity, will vary accordingly.

Such resins are soluble in various organic solvents.

Although only citric acid (since this is the preferred cross-linking agent) and tricarballylic acid have been used in the above examples, other cross-linking agents may be used, such as citric acid heat conversion products, including aconitic acid (an olefinically unsaturated tricarboxylic acid), itaconic acid (an olefinically unsaturated dicarboxylic acid), citraconic acid and mixtures thereof. Tricarballylic acid is obtained by hydrogenation of the olefinic unsaturation of aconitic acid. This group of acids and their anhydrides are referred to herein as the "citric acid family."

Esters of these acids may be used but an alcoholysis catalyst should preferably be present. However, the curing rate will be considerably slower and the curing temperature higher than that of the acid, particularly in the absence of such a catalyst, hence the acid is preferred. Since the esters are usually more soluble in organic solvents than the acids, their use provides a means of introducing adequate concentrations of acid radical contributing materials, but a sacrifice in curing cycle is involved.

In addition to the citric acid family, malic acid and its esters have been found to yield satisfactory finishes for glass. This is a monohydroxy-dicarboxylic acid that is structurally similar to citric acid.

Diglycollic acid (a dicarboxylic acid having an ether linkage) also yields satisfactory finishes for glass.

Tartaric acid, a dihydroxy dicarboxylic acid, yields inferior products to those containing citric or malic acids, particularly in reference to retention of adhesion to glass.

Orthodox dicarboxylic resinification acids, like phthalic, maleic, fumaric, adipic and sebacic, also fail to give the desired retention of adhesion, as do mono-hydroxy mono-carboxylic acids like glycollic.

Amino alcohols, such as mono-, di- and triethanol amines, and polyamines, such as diethylene triamine, diphenyl diamine, hexamethylene tetramine and triethylene pentamine, likewise fail to produce satisfactory results in resistance to attack and desired retention of adhesion to glass. This indicates that the amino group apparently is not equivalent to the carboxyl group for curing epoxyhydroxy polyether resins for application to glass where retention of adhesion is important.

Although films cured with these unsatisfactory cross-linking agents were found to have an initial adhesion value of the magnitude of 17,000 grams, after immersion in water for three days they exhibited values of the magnitude of 1500 grams and lower and were therefore recognized as inadequate in retention of adhesion.

While Monastral blue, Victoria maroon and rutile titanium dioxide are the only coloring materials included in the above examples, it will be obvious that the desired decorative effects may be produced by other organic and inorganic coloring materials, such as carbon black, cadmium red, Blue Lake [(13% Ponsol Blue, 10% aluminum hydrate and 77% blanc fixe)—Krebs BP-179-D], Blue Lake Krebs BP-258D, Lithol Toner, Yellow Lake—Krebs YL-387-D or Indian Yellow F, Chrome Yellow, Iron Blue, Milori Blue, Monastral Green, Maroon Toner—Krebs RT-436-D, chrome green, chrome orange, iron oxide reds, aluminum powder and flatting agents, like diatomaceous silica and silica aerogel. These and any other added agents should be so selected, however, that they are non-reactive with the polyether resins, particularly at atmospheric temperatures, as otherwise they may cause poor storage stability and also adversely affect the retention of adhesion.

The amount of citric acid or equivalent cross-linking agent required to produce the desired cured finishes is in excess of catalytic small amounts; i. e., in excess of 5% based on the resin. Results have indicated that the preferred ratio of citric acid is 15 to 28% of the reactive epoxy-hydroxy polyether resin (i. e., 1.5 to 2.8 parts of citric acid for each 10 parts of this resin). Less than the preferred minimum would not give the desired retention of adhesion, for example on one trip glass bottles, such as non-returnable glass containers. More than the preferred maximum may result in insufficient solubility and incompatibility of the acid.

While the coating compositions of this invention are not limited to use on glass, and may be applied to metal and other non-metallic substrates which will stand the heating step, their preferred use and special characteristics are in connection with glass.

For many years the glass industry has felt a distinct need for coating compositions for decorative purposes which have the desirable properties of glazes and ceramic colors, but which may be applied without the use of high temperatures and the problems associated with the application of these inorganic finishes.

Since the present compositions may be applied to clean glass by spray application or in other ways, as by hand painting, brushing, dipping, or roll coating, and subjecting the coated articles to only a moderate heat cycle to effect the cross-linking and adhesion, they represent a distinct improvement in the art, especially in view of their chemical stability and high retention of adhesion to glass.

While various curing cycles may be used, a 30 to 10 minute cycle in the range of 375-475° F. is preferred. A 15 to 10 minute cure at 425-450° F., of a composition like that in Example 1, was found to be particularly effective and adaptable to commercial production-line operation. The longer periods of baking are applicable to the lower temperatures. The minimum temperature for practical conversion was found to be 330° F. for 1 hour or more. Temperatures in excess of 550° F. were found impractical, although at 550° F. the curing period was from 5 to 10 minutes. It will also be obvious that the maximum curing temperature is influenced by the properties of the glass substrate, as for example the fact that it is generally considered necessary to re-anneal glass if heated to temperatures of more than about 500° F.

From the above, it will be apparent that the compositions of the present invention may be cured on glass in cycles of about 15 minutes at about 425° F., compared with the 2-hour cycle required for ceramic coatings. The curing of the finishes of the present invention is not limited to baking in ovens, but may be carried out in any desired way, as, for example, by infra-red heating.

The compositions of the present invention yield films on glass which are not affected by immersion in water, dilute alkali solutions, soap solutions or mild acid solutions, associated with normal household usage, or organic solvents, for periods of 48 hours and longer. These coatings resist dishwashing and attack by food acids, alcoholic beverages, nail polish, nail polish removers, organic solvents, and cigarette butts.

While glass compositions are of many types, it is believed that the compositions of the present invention are useful for coating all types of glass since identical results have been obtained with ordinary window glass, bottle glass, plate glass, and Pyrex glass.

It is apparent that many widely different embodiments of this invention can be made without departing from the spirit and scope thereof; and, therefore, it is not intended to be limited except as indicated in the appended claims.

We claim:

1. A coating composition which has strong retention of adhesion to glass, comprising an esterifiable epoxyhydroxy polyether resin and a member of the group which consists of citric acid, tricarballylic acid, aconitic acid, itaconic acid, citraconic acid, malic acid and diglycollic acid, said member of the group being capable of being cross-linked to the resin when the composition is heated to 330° F. for 1 hour.

2. A coating composition which has strong retention of adhesion to glass, comprising an esterifiable epoxyhydroxy polyether resin and citric acid, the citric acid being capable of being cross-linked to the resin when heated to 330° F. for 1 hour.

3. A coating composition which has strong retention of adhesion to glass, comprising an esterifiable epoxyhydroxy polyether resin and tricarballylic acid, the tricarballylic acid being capable of being cross-linked to the resin when heated to 330° F. for 1 hour.

4. A coating composition which has strong retention of adhesion to glass, comprising an esterifiable epoxyhydroxy polyether resin and malic acid, the malic acid being capable of being cross-linked to the resin when heated to 330° F. for 1 hour.

5. The coating composition of claim 1, in which the cross-linking agent is present in the ratio of 1.5-2.8 parts to 10 parts of resin.

6. The coating composition of claim 2, in which the cross-linking agent is present in the ratio of 1.5-2.8 parts to 10 parts of resin.

7. The coating composition of claim 1, in which the resin is a reaction product of bis-phenol and epichlorohydrin.

8. The coating composition of claim 2, in which the resin is a reaction product of bis-phenol and epichlorohydrin.

9. The coating composition of claim 1, in which the resin is a reaction product of bis-phenol and epichlorohydrin having a melting point of 125-135° C. and an esterification equivalent of about 190.

10. The coating composition of claim 2, in which the resin is a reaction product of bis-phenol and epichlorohydrin having a melting point of 125-135° C. and an esterification equivalent of about 190.

11. A coating composition which has strong retention of adhesion to glass, comprising a substantially chlorine-free esterifiable condensation polymer of bis-phenol with an excess of epichlorohydrin and a latent cross-linking agent therefor, the latter being a member of the group which consists of citric acid, tricarballylic acid, aconitic acid, itaconic acid, citraconic acid, malic acid, and diglycollic acid, said coating composition being resistant to water, dilute alkali solutions, soap solutions, mild acid solutions and organic solvents when baked at 330° F. for 1 hour.

12. A coating composition which has strong retention of adhesion to glass, comprising an esterifiable epoxyhydroxy polyether resin, a member of the group which consists of citric acid, tricarballylic acid, aconitic acid, itaconic acid, citraconic acid, malic acid, and diglycollic acid, and an opaque pigment, said member of the group being capable of being cross-linked to the resin when the composition is heated to 330° F. for 1 hour.

13. A coating composition which has strong retention of adhesion to glass, comprising an esterifiable epoxyhydroxy polyether resin, a member of the group which consists of citric acid, tricarballylic acid, aconitic acid, itaconic acid, citraconic acid, malic acid, and diglycollic acid, and a transparent organic dyestuff, said member of the group being capable of being cross-linked to the resin when the composition is heated to 330° F. for 1 hour.

14. A coating composition which has strong retention of adhesion to glass, comprising an esterifiable epoxyhydroxy polyether resin, a member of the group which consists of citric acid, tricarballylic acid, aconitic acid, itaconic acid, citraconic acid, malic acid, and diglycollic acid, and a coloring material, said member of the group being capable of being cross-linked to the resin when the composition is heated to 475° F. for 10 minutes.

15. A process of applying a substantially permanent decorative finish to glass, comprising coating the glass with a solution of an esterifiable epoxyhydroxy polyether resin and a latent cross-linking agent therefor of the group which consists of citric acid, tricarballylic acid, aconitic acid, itaconic acid, citraconic acid, malic acid, and diglycollic acid, and subjecting said coated glass to a temperature between 330° F. and 475° F. for from 1 hour to 10 minutes.

16. A process of applying a substantially permanent recorative finish to glass, comprising coating the glass with a solution of an esterifiable epoxyhydroxy polyether resin and a latent cross-linking agent therefor of the group which consists of citric acid, tricarballylic acid, aconitic acid, itaconic acid, citraconic acid, malic acid, and diglycollic acid, and heating said coated glass at a temperature of at least 330° F. to effect cross-linking between the resin and the latent cross-linking agent.

17. A process of applying a substantially permanent decorative finish to glass, comprising coating the glass with a solution of an esterifiable epoxyhydroxy polyether resin and citric acid, and heating said coated glass to effect cross-linking between the resin and the citric acid.

18. A process of applying a substantially permanent decorative finish to glass, comprising coating the glass with a solution of an esterifiable epoxyhydroxy polyether resin, a latent cross-linking agent therefor of the group which consists of citric acid, tricarballylic acid, aconitic acid, itaconic acid, citraconic acid, malic acid, and diglycollic acid, and a coloring agent which is non-reactive with the acid and stable at the temperature used, and subjecting said coated glass to a temperature between 330° F. and 475° F. for from 1 hour to 10 minutes.

19. A process of applying a substantially permanent decorative finish to glass, comprising coating the glass with a solution of an esterifiable epoxyhydroxy polyether resin, a latent cross-linking agent therefor of the group which consists of citric acid, tricarballylic acid, aconitic acid, itaconic acid, citraconic acid, malic acid, and diglycollic acid, and an opaque pigment which is non-reactive with the acid and stable at the temperature used, and subjecting said coated glass to a temperature between 330° F. and 475° F. for from 1 hour to 10 minutes.

20. A process of applying a substantially permanent decorative finish to glass, comprising coating the glass with a solution of an esterifiable epoxyhydroxy polyether resin, a latent cross-linking agent therefor of the group which consists of citric acid, tricarballylic acid, aconitic acid, itaconic acid, citraconic acid, malic acid, and diglycollic acid, and a transparent organic dyestuff which is non-reactive with the acid and stable at the temperature used, and subjecting said coated glass to a temperature between 330° F. and 475° F. for from 1 hour to 10 minutes.

21. The combination of a glass article and a substantially permanent decorative finish therefor, comprising a coating of an esterifiable epoxyhydroxy polyether resin and a member of the group which consists of citric acid, tricarballylic acid, aconitic acid, itaconic acid, citraconic acid, malic acid, and diglycollic acid, said composition having been baked on the glass article by heating to curing temperature in the range of 375-475° F. for from 30-10 minutes.

22. The combination of a glass article and a substantially permanent decorative finish therefor, comprising a coating of an esterifiable epoxyhydroxy polyether resin and citric acid, said composition having been baked on the glass article by heating to curing temperature in the range of 375-475° F. for from 30-10 minutes.

ALLEN CLELAND BUCK.
JOSEPH FRANCIS CONLON.

REFERENCES CITED

The following references are of record in the file of this patent:

UNITED STATES PATENTS

| Number | Name | Date |
| --- | --- | --- |
| 2,121,680 | Arvin | June 21, 1938 |
| 2,324,483 | Castan | July 20, 1943 |

FOREIGN PATENTS

| Number | Country | Date |
| --- | --- | --- |
| 576,177 | Germany | May 8, 1933 |